UNITED STATES PATENT OFFICE.

CARLETON ELLIS, OF MONTCLAIR, NEW JERSEY.

PROCESS OF ELECTRICALLY PREPARING CATALYSTS FOR HYDROGENATION.

1,299,565. Specification of Letters Patent. Patented Apr. 8, 1919.

No Drawing. Application filed November 14, 1916. Serial No. 131,253.

*To all whom it may concern:*

Be it known that I, CARLETON ELLIS, a citizen of the United States, and a resident of Montclair, in the county of Essex and State of New Jersey, have invented certain new and useful Improvements in Processes of Electrically Preparing Catalysts for Hydrogenation, of which the following is a specification.

This invention relates to the preparation of catalyzers adapted for use in the hydrogenation or hardening of fatty oils or similar material and relates particularly to the electrolytic production of a catalyzer comprising active nickel and the like derived by electrical comminution or formation as by electrolytically depositing the metal as for example from a saline solution.

This invention contains matter disclosed in my copending application Serial No. 686,988 filed Mar. 29, 1912. (From Serial No. 679,771).

The object of the present invention is to obtain a catalyzer by forming catalytic nickel by an electrical method so as to secure the metal in such an extended condition as to afford a very extensive surface for the action of hydrogen thereby enabling fatty oils containing unsaturated bodies such as olein to be saturated with hydrogen forming harder products of greater commercial value.

One embodiment of the present invention comprises the deposition of a metal such as nickel by electrolysis, as from a saline electrolyte, on a carrier or support which preferably has an affinity or absorptive capacity for hydrogen so that hydrogen may be occluded by the mass of supporting material thereby forming a storehouse of the gas for the active or more active surfaces. Such coöperating supporting material may be, for example, charcoal, graphite or other suitable form of carbon or it may be a metal such as nickel in a form which may be inactive or only slightly active as regards the property of transmitting hydrogen to oil or nickel; forming a hydrogen occluding support for the more active nickel material. The latter for example, may be in the form of a metallic sponge coated on charcoal particles, powdered graphite or a metallic support. In order to deposit nickel from solution in this manner preferably a current of relatively high density is employed. An electrolyte containing nickel sulfate or nickel ammonium sulfate may be employed, of preferably fairly weak concentration and to the mass there may be added a small amount about five per cent. or so of titanium salt. A nickel anode may be employed and the cathode may be a mass of powdered charcoal or graphite which is kept in motion during the deposition or the cathode may be of any other suitable material or support. A small amount of copper is sometimes desirable and this may be introduced into the electrolyte or otherwise. A small amount of zinc sulfate enables the production of a more spongy form of nickel. A mixed deposit of nickel and some titanium material may likewise be obtained which is efficient as a catalyzer. The titanium aids in modifying the character of the nickel so as to produce a greater measure of hydrogen absorption.

If any undesirable oxidation of the particles of catalytic material has occurred, these may be reduced by exposing to a current of hydrogen at say 350° C., or they may be reduced in oil by passage of a current of hydrogen therethrough at 250 to 275° C. In the latter case the presence of a small amount of copper or titanium apparently aids in the reduction or serves as an assistant in reduction. The material so prepared may be introduced into fatty oil heated to about 180° C. Hydrogen or a hydrogen containing gas is introduced and the oil hardened to a product of the desired melting point. The electrolytically-deposited catalyzer may be placed in a tower through which the oil is caused to flow while contact with hydrogen is effected and the hardened oil drawn off at the bottom of the tower in a continuous manner. Or the catalyzer may be agitated with the oil in the presence of hydrogen to produce a hardened product.

The advantages of the electrolytic nickel or metal are several. Among these may be mentioned the tendency during the electrolytic deposition especially when using currents of high density to occlude more or less hydrogen in the nickel material which apparently is advantageous. Another advantage is the ability to obtain nickel in a very uniformly extended condition so that a relatively great surface is exposed, enabling a small amount of catalyzer to serve in hardening a large amount of oil. Another advantage is that the texture of the electrolytically deposited nickel is particularly suited as a source of catalytic material. By electrolysis under well regulated conditions, a very pure deposit of the metal is obtained. This often is difficult by wet methods involving washing of precipitates. By way of illustration it may be noted that nickel sulfate solution treated with alkali forms a precipitate which is very difficult to free from sulfates. If this precipitate with or without a carrier is not completely freed of sulfates by tedious washing and other special treatment sulfids may form on reduction with hydrogen at 350° or higher and the catalyzer will be poisoned. By the present method catalyzer is obtained without this serious contamination with sulfur so that an electrolyte such as nickel sulfate or nickel ammonium sulfate solution may be employed yielding efficient catalytic material cheaply.

When the catalytic material is carried on a support which is porous and the latter becomes impregnated with the material it is even more difficult to remove the occluding sulfate or basic sulfate which forms and the reduction of the latter to form sulfids when the raw catalytic material is exposed at high temperatures to a reducing gas yields a product which usually has very poor catalytic properties in fact so as to be incapable of use but once or twice and therefore being practically inoperative in comparison with catalyzers which are so free from poisons that they may be used daily for weeks or months without serious impairment of their catalytic properties.

The advantages of electrical formation of nickel catalyzer also embrace the point that the metal may be deposited in a finely extended condition without resorting to reduction by means of hydrogen at high temperatures with undesirable sintering of the product and consequent loss in catalytic value. When nickel hydrate or other material is subjected to an atmosphere of hydrogen but not in contact with oil or other liquid vehicle, ordinarily it is considered necessary to heat the finely divided material in such hydrogen atmosphere to a temperature of 400 to 500° C., and in some cases the catalyzer is prepared at a fairly strong red heat. This tends to cause sintering and agglomeration of the particles and in consequence the surface exposure is not sufficient. In other words, the material shrinks or compacts to form a product having too little superficial area to effectually yield the requisite catalytic properties for the purpose in hand. The extension of the catalyzer on a bulky carrier is a makeshift in the effort to obviate the disadvantages of sintering which arise during high temperature reduction of the catalytic material by itself.

Hydrogenated or hardened oil may be prepared by treating fatty animal or vegetable oils including corn, cottonseed, castor, Chinese wood oil, linseed, peanut, sesame, fish, cod, whale or lard, tallow and greases of various descriptions, with hydrogen in the presence of a catalyst, e. g. as described in my U. S. Patent 1,026,156, and others.

In the foregoing embodiments of my invention as detailed in the specific procedures set forth it is primarily my object as stated in Serial No. 686,988, to produce a metallic sponge in a highly comminuted state and for the purpose of producing such a metallic sponge of nickel or similar metal in a state of extreme comminution, I preferably employ a current of relatively high density so that the nickel material will be readily and suitably yielded in this condition.

To recapitulate the process of the present invention involves the forming of a metal sponge, preferably of nickel, in a highly comminuted state by electrical action.

The use of the catalyst prepared in accordance with the present invention is not claimed herein, but in my co-pending application, 118,750.

What I claim is:—

1. The process of forming finely-divided spongy nickel by electrical action which comprises passing an electric current of high density from a nickel electrode to a mass of charcoal material, both the nickel electrode and charcoal material being immersed in a liquid electrolyte; whereby metallic sponge in a highly comminuted state adapted for use as a hydrogenating catalyst is deposited on said charcoal material.

2. The process of producing a catalyst comprising finely-divided spongy nickel on a carbon base, by electrical action, such process including the passage of an electric current of high density from a nickel electrode to a mass of carbon, both the nickel electrode and carbon being immersed in a liquid electrolyte; whereby porous spongy nickel adapted for use as a hydrogenating catalyst is deposited on said carbon; introducing the so-produced nickel-carbon catalyst into an organic material containing unsaturated material and capable of acting as a sealing fluid.

CARLETON ELLIS.